US012485933B2

(12) United States Patent
Hans Wolfgang Coester et al.

(10) Patent No.: US 12,485,933 B2
(45) Date of Patent: Dec. 2, 2025

(54) SEGMENT ISOLATING VALVE FOR PNEUMATIC TRANSPORT SYSTEM (71) Applicant: Aerom Sistemas De Transporte SA, São Leopoldo (BR)

(72) Inventors: Oskar Hans Wolfgang Coester, Porto Alegre (BR); Marcus Coester, Porto Alegre (BR)

(73) Assignee: Aerom Sistemas De Transporte SA, São Leopdoldo (BR)

( * ) Notice: Subject to any disclaimer, the term of this patent is extended or adjusted under 35 U.S.C. 154(b) by 809 days.

(21) Appl. No.: 17/788,775

(22) PCT Filed: Dec. 8, 2020

(86) PCT No.: PCT/BR2020/050523
§ 371 (c)(1),
(2) Date: Jun. 24, 2022

(87) PCT Pub. No.: WO2021/127760
PCT Pub. Date: Jul. 1, 2021

(65) Prior Publication Data
US 2023/0332690 A1    Oct. 19, 2023

(30) Foreign Application Priority Data

Dec. 27, 2019  (BR) .............................. 102019028037

(51) Int. Cl.
*B61B 13/12*     (2006.01)
*F16K 1/18*      (2006.01)
(Continued)

(52) U.S. Cl.
CPC ............ *B61B 13/122* (2013.01); *B61B 13/12* (2013.01); *F16K 1/18* (2013.01); *F16K 35/10* (2013.01); *B61B 13/10* (2013.01)

(58) Field of Classification Search
CPC ......... B61B 13/122; B61B 13/12; F16K 1/18; F16K 35/10; F15D 1/14; F24F 7/00;
(Continued)

(56) References Cited

U.S. PATENT DOCUMENTS 2,272,928 A  *  2/1942  Weaver ................... F24F 13/15
                                                454/351
3,605,629 A  *  9/1971  Edwards ............... B61B 13/122
                                                104/138.1
(Continued)

FOREIGN PATENT DOCUMENTS

BR         7906255 A      8/1980
BR         8301706 A      11/1984
(Continued)

OTHER PUBLICATIONS

International Search Report in international application No. PCT/BR2020/050523 mailed Feb. 19, 2021, 2 pages.
(Continued)

*Primary Examiner* — S. Joseph Morano
*Assistant Examiner* — Heaven R Buffington
(74) *Attorney, Agent, or Firm* — Berg Hill Greenleaf Ruscitti LLP.

(57) ABSTRACT

Segment isolating valves assembled on the lower back of the elevated guideway (1), the plug base (2) being hinged on a housing (3) fixed to the elevated guideway (1) by a flange (4) for fast connection and disconnection. The housing (3) is equipped with a rainwater runoff tank (5). The segment isolating valve comprises a plug (2) mounted in a housing (3) affixed to the elevated guideway by means of a flange (4) for fast connection and disconnection. The plug (2) is moved by means of a linear actuator (6), whose rod exerts force on an articulation (7), which is pivoted above on the plug (2) and below on a frame (8) affixed to the housing base (3). The
(Continued)

assembly is mechanically locked through a closed position locking cam (9), displaced automatically by springs (10). A safety locking pin (11) is actuated by a release solenoid (12).

12 Claims, 6 Drawing Sheets

(51) Int. Cl.
*F16K 35/10* (2006.01)
*B61B 13/10* (2006.01)

(58) Field of Classification Search
CPC .. F24F 13/08; F24F 13/10; F24F 13/12; F24F 13/14; F24F 13/15; F24F 13/18
USPC .................................................. 104/155, 156
See application file for complete search history.

(56) References Cited

U.S. PATENT DOCUMENTS

| | | | |
|---|---|---|---|
| 3,722,424 A | 3/1973 | Van Veldhuizen | |
| 4,120,483 A * | 10/1978 | LeRoch | F16K 1/205 74/89.45 |
| 4,774,891 A * | 10/1988 | Coester | E01B 25/00 104/155 |
| 2004/0244635 A1 | 12/2004 | Schlienger | |
| 2011/0165828 A1* | 7/2011 | Horner | F16K 1/223 454/74 |

FOREIGN PATENT DOCUMENTS

| | | | | |
|---|---|---|---|---|
| BR | 8503504 A | | 9/1986 | |
| BR | 9502056 A | | 8/1997 | |
| BR | 102014014409 A2 * | | 4/2016 | ............. E01B 25/00 |
| GB | 2372731 A | | 9/2002 | |

OTHER PUBLICATIONS

Written Opinion/International Preliminary Examination Report in international application No. PCT/BR2020/050523 mailed Feb. 19, 2021, 4 pages.

* cited by examiner

SEGMENT ISOLATING VALVE FOR PNEUMATIC TRANSPORT SYSTEM

CROSS-REFERENCE TO RELATED APPLICATION

This application is a national stage application under 35 U.S.C. 371 of PCT Application No. PCT/BR2020/050523 having an international filing date of Dec. 8, 2020, which designated the United States, which PCT application claimed the benefit of Brazil Application Serial No. 102019028037-9, filed Dec. 27, 2019, both of which are incorporated by reference in their entirety.

INTRODUCTION

This invention refers to the improvement developed for segment isolating valves of an elevated guideway that acts simultaneously as a pneumatic propulsion duct for transportation vehicles carrying passengers and loads, wherein the segment isolating valve is endowed with multiple features.

STATE OF THE ART

Patent of Invention PI 9912112-3 and its corresponding U.S. Pat. No. 6,213,026 describe a transportation system whose vehicles are propelled pneumatically along a guideway by a propulsion plate extending into the air duct, which is defined by the actual guideway.

The vehicles are fitted with bogies, preferably with four metal wheels each, with at least one of the axles connected to a downward-facing pylon and bolted to a propulsion plate, with an area corresponding to the open cross-section area of the duct, which is responsible for the conversion of the fluid thrust into mechanical work for moving the vehicles over rails seated on a special elevated guideway.

The elevated guideway superstructure is assembled on vertical pillars and has a first function of supporting and guiding the vehicles, and a second and no less important function of forming a propulsion duct in its interior. Consequently, the elevated guideway provides the physical means of support and guidance for the movement of the vehicles, as well as the means of spreading the airflow generated by stationary power propulsion units in stations distributed along the vehicle's route.

Each power propulsion unit consists of a heavy-duty industrial fan and a set of flow control and direction valves that increase or reduce the pressure in the duct defined by the beams forming the superstructure.

The pneumatic transport system operates on the principle of separating the track into multiple distinct sections, defining dedicated propulsion circuits and consequently exclusive and independent automatic control sections for each vehicle. The advance of a specific vehicle to the next control section is thus allowed only if it is vacant.

Entitled Pneumatic Propulsion System for High Capacity Transportation of Passengers and/or Loads. Patent BR 10 2018 074144-6 provides details of possible propulsion circuits that may propel a vehicle by up to two power propulsion units, depending on the level of propulsion required, with each located at one end of the section, the first section working in a pressure mode and the second section in a suction mode. As a general rule, these propulsion circuits extend from one passenger station to the other; however, the specific characteristics of each application quite frequently require the introduction of intermediate sections between them, or coverage of more stations. The control sections of these propulsion circuits are dynamic, whereby they may be reconfigured and adjusted to the position of the vehicle on the track during its normal movement, through a route alignment and/or traffic control command in relation to other vehicles in operation at the same time.

A segment isolating valve is the device that allows the physical interruption of the propulsion duct and thus the separation of these divisions into individual control sections. The actuating mechanism of the segment isolating valves is mounted on the lower back of the elevated guideway and its plug is positioned in the elevated guideway propulsion duct. The segment isolating valves compartmentalize a propulsion circuit from its neighbor by blocking the airflow.

The segment isolating valves have only two positions: fully open or fully shut, with their failure characterized by being locked in the last position known to the automatic control subsystem. In the open position, the duct is clear, allowing a free flow of air and the movement of the vehicle's propulsion plates. Passing through an open valve allows it to safely enter the next propulsion circuit or section.

The original mechanical form of the segment isolating valves is presented in patent PI 8301706-2 and its respective corresponding U.S. Pat. No. 4,658,732, describing in detail a rotating, butterfly-type actuation system that is fragile and dependent on the resistance of its axle. Yet another drawback of this original design is that the plate is exposed to severe bending stress generated by the pressures in the propulsion duct. Another inconvenience of this original shape is that it generates a bulky volume below the elevated guideway that, in addition to an undesirable appearance, also adversely affects the open space underneath that could be used for the transit of people and vehicles. Yet another drawback is the lack of an intrinsic locking device in the open or shut position, which would prevent involuntary movement without actuation.

The original mechanical form of the segment isolating valves is presented in patent PI 8301706-2 and its respective corresponding U.S. Pat. No. 4,658,732, which describe in detail a rotating, butterfly-type actuation system that is fragile and dependent on the resistance of its axle. Yet another drawback of this original design is that the plate is exposed to severe bending stress generated by the pressures in the propulsion duct. Another inconvenience of this original shape is that it generates a bulky volume below the elevated guideway that, in addition to an undesirable appearance, also adversely affects the open space underneath that could be used for the transit of people and vehicles. Yet another drawback is the lack of an intrinsic locking device in the open or shut position, which would prevent involuntary movement without actuation.

Solution of the Invention

The improvement in segment isolating valves for propulsion pneumatic duct used for vehicles transporting passengers and loads addressed by this invention effectively solves the above-mentioned problems at the state of the art.

In the improved segment isolating valves constituting the invention, the linear actuator no longer applies force directly to the plug, but rather to an articulation arrayed according to a three-bar mechanism. Unlike the previous model, with nothing was specified about its locking mechanism, the improved segment isolating valves are now equipped with a quadruple redundant system:

a) Intrinsic locking in the open or shut position due to the angle formed between the articulation bars and the actuator at both ends of the run, characterizing the valve as "monostable";

b) Locking through the action of a cam parallel to the plug-turning axis, actuated by two springs, and sliding towards two slots in the plug frame, one for the open position and the other for the shut position;

c) Positive locking with two redundant safety locking pins, positioned on opposite sides of the plug frame, with two holes each that ensure locking in the open or shut position; the safety pins are actuated for release by a solenoid.

A compact alternative device in the segment isolating valves addressed by the invention is also disclosed, which is not described in the above-mentioned patents, and is especially applicable to the diverter beams, whose assembly is subject to geometrical constraints resulting from their small radius curvature. The alternative device is a sliding drawer type that consists of a plug divided into several hinged segments (vanes) that are coiled on the lower back of the elevated guideway by the action of an actuator coupled to a gear, locked in position by linear pneumatic cylinders. This alternative also offers the advantage of low visual impact.

Advantages of the Invention

The improvement in segment isolating valves of pneumatic propulsion ducts of transportation vehicles addressed by this invention leads to the following advantages over earlier conceptualizations at the state of the art:

Equipment that is secured against unintentional opening by redundant locking;

Significant reduction in the external volume of the equipment, mitigating visual impacts and freeing up larger spaces below the elevated guideway for traffic;

Alternative arrangement of segment isolating valves, whose housing dimension is reduced, allowing assembly in small-radius curves and resulting in even smaller external volumes with less visual impact.

DESCRIPTION OF THE APPENDED DRAWINGS

In order to ensure a full understanding of the improvement in segment isolating valves for pneumatic propulsion duct of transportation vehicles addressed by this invention, whereby it may be implemented by any multidisciplinary group of technicians in this technological sector, it is now described in a clear and sufficient manner through the following drawings.

DETAILED DESCRIPTION OF THE INVENTION

Figure 1:
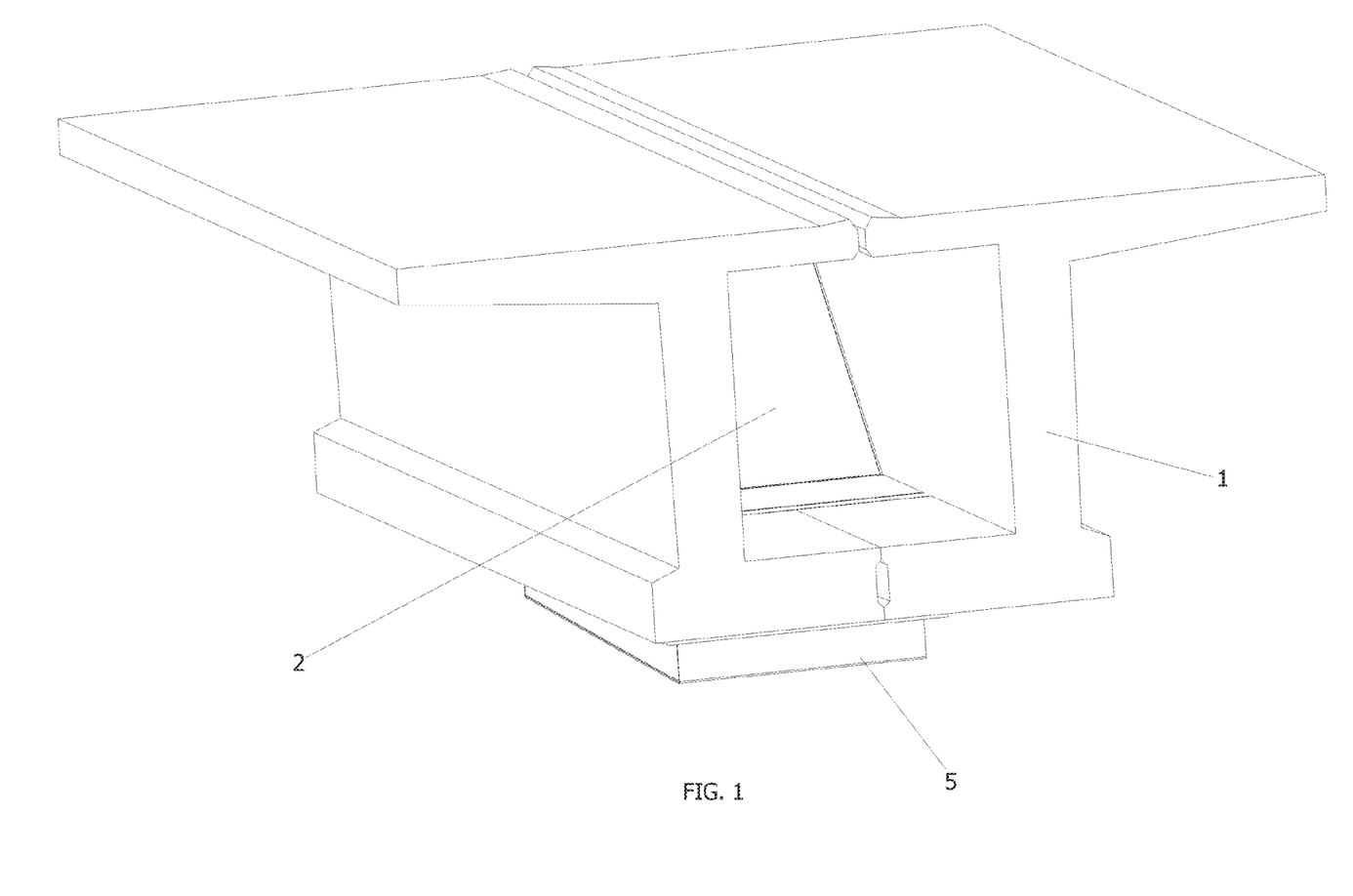
FIG. 1—Perspective view of a segment of the elevated guideway with a segment of the preferred isolating valves installed.

FIG. 1 illustrates a segment of the elevated guideway (1) with a preferred segment isolating valve installed and with the plug (2) in the shut position.

Figure 2:
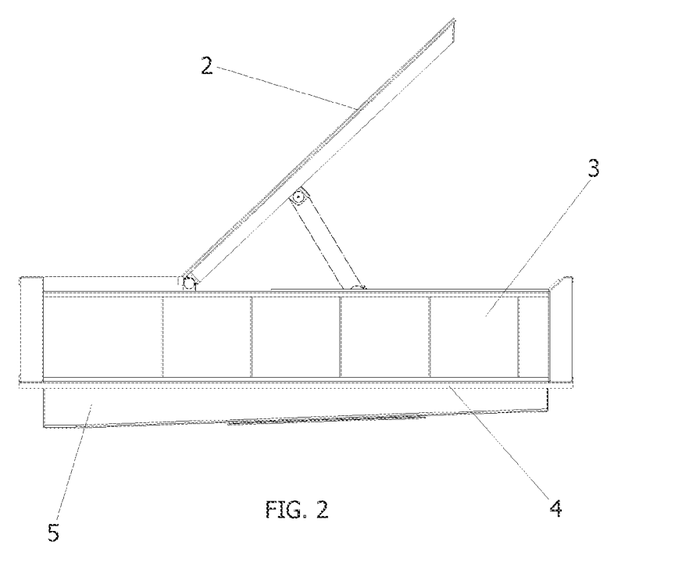
FIG. 2—Axial cross-section view of a segment of the elevated guideway with a segment of the preferred isolating valves actuated.
Figure 3:
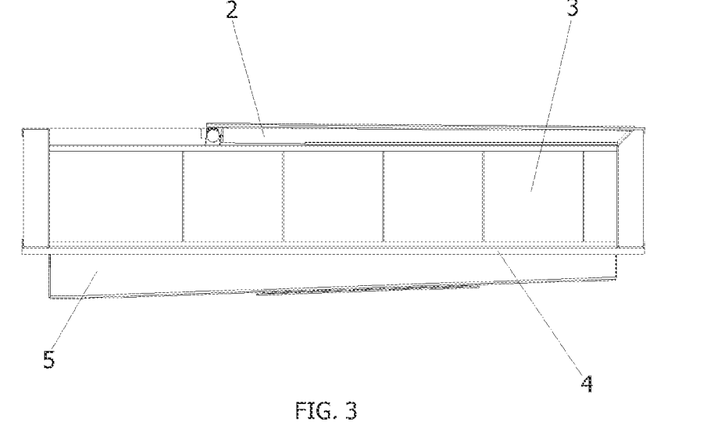
FIG. 3—Axial cross-section view of a segment of the elevated guideway with a preferred segment isolating valves not actuated.

FIGS. 2 and 3 illustrate a preferred segment isolating valve assembled on the lower back of the elevated guideway (1) with the plug (2) in the open position and the shut position, respectively. The plug base (2) is hinged on a housing (3) affixed to the elevated guideway (1) by a flange (4) for fast connection and disconnection. The housing (3) is fitted with a rainwater runoff tank (5).

Figure 4:
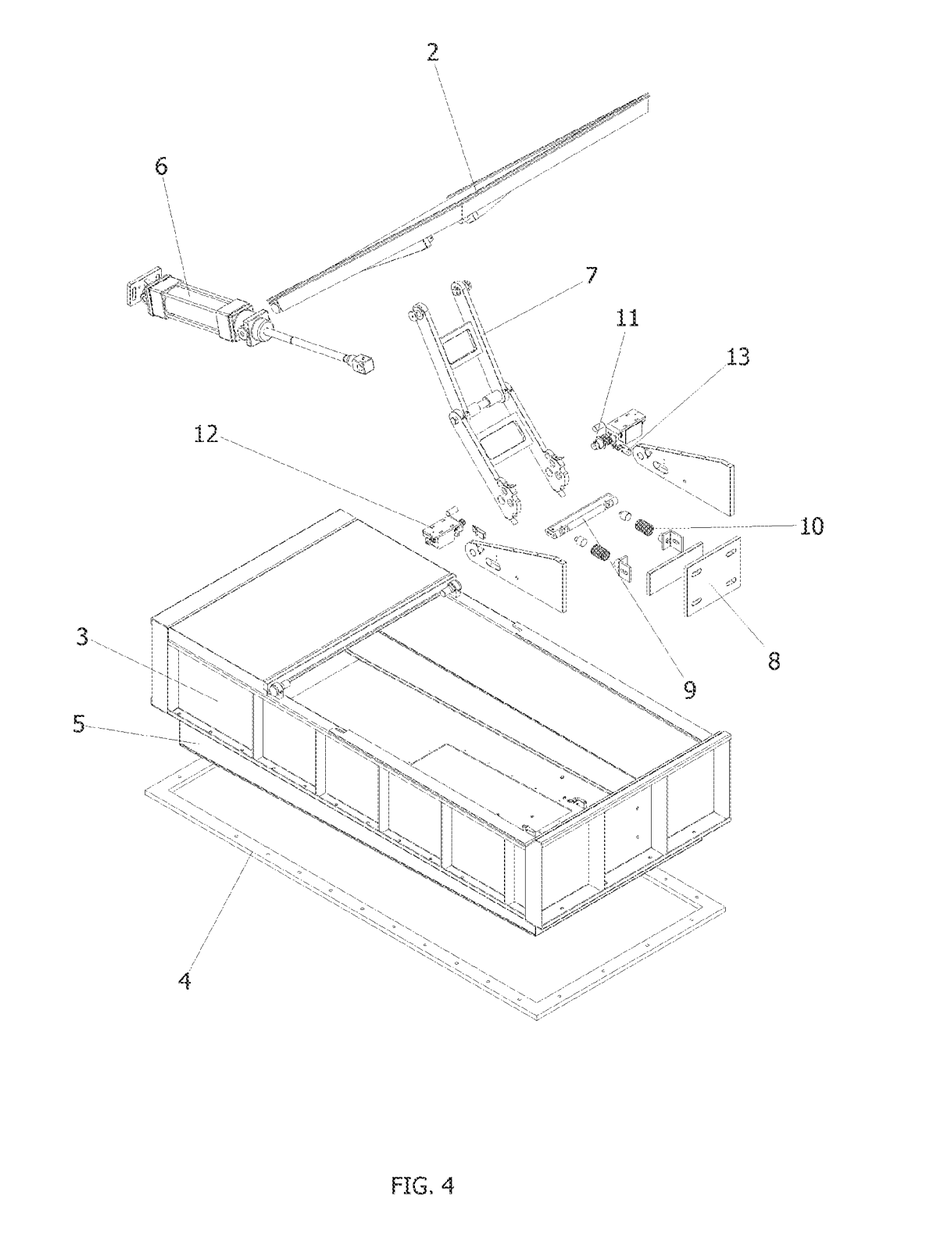
FIG. 4—Exploded perspective view of the preferred segment isolating valves.

FIG. 4 describes the preferred segment isolating valves in detail, comprised of a plug (2) mounted in a housing (3) affixed to the elevated guideway by a flange (4) for fast connection and disconnection. The plug (2) is moved by a linear actuator (6), whose rod exerts force on an articulation (7). The articulation (7) is pivoted above on the plug (2) and below on a frame (8) affixed to the housing base (3).

Preferably, the assembly is mechanically locked through a closed position locking cam (9) moved automatically by springs (10). A safety locking pin (11) is actuated by a release solenoid (12). This is a vital function directly linked to the automatic protection subsystem (ATP), preventing the segment isolating valves from moving in response to a spurious command. The position of the segment isolating valves is given by a position sensor (13).

Figure 5:
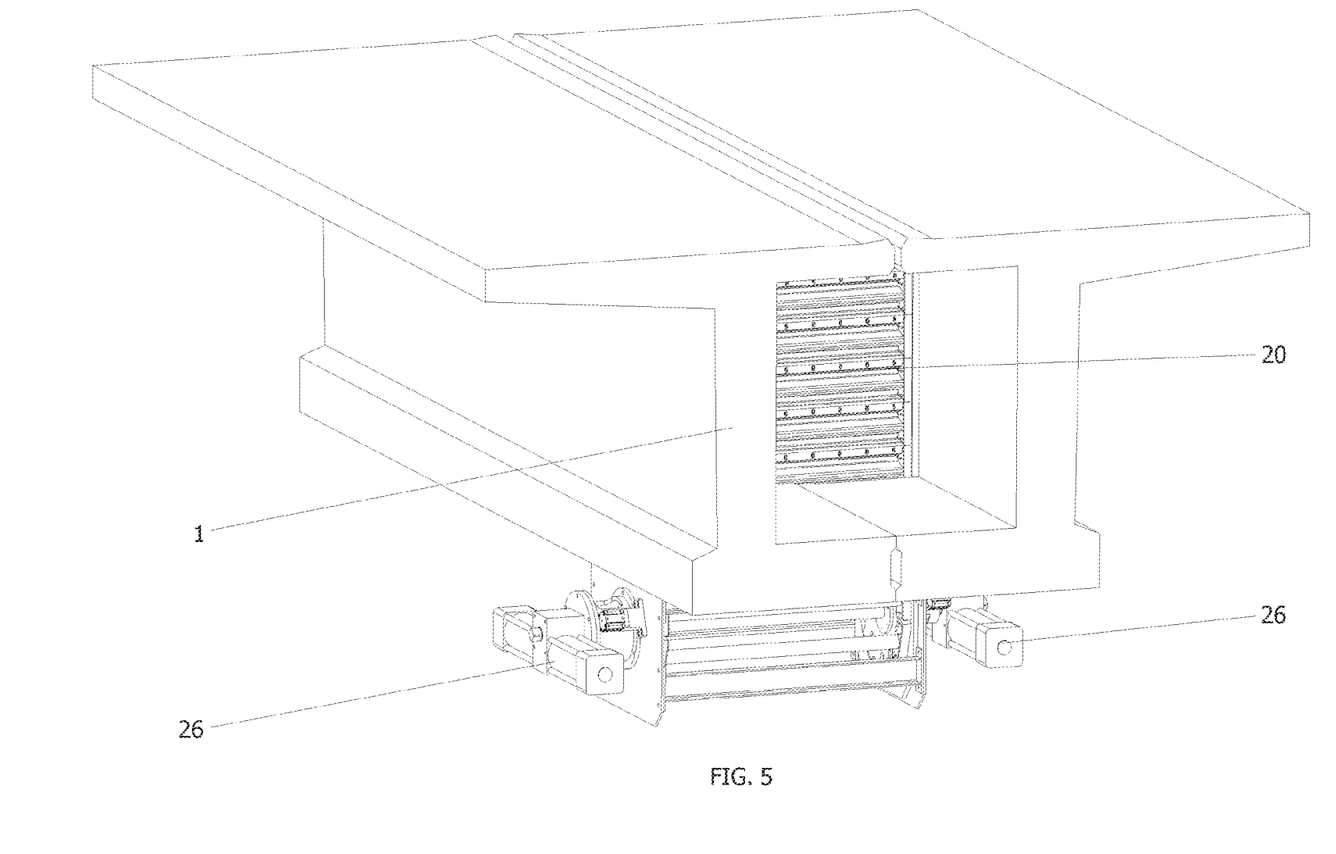
FIG. 5—Perspective view of a segment of the elevated guideway with an alternative segment of the isolating valves installed.
Figure 6:
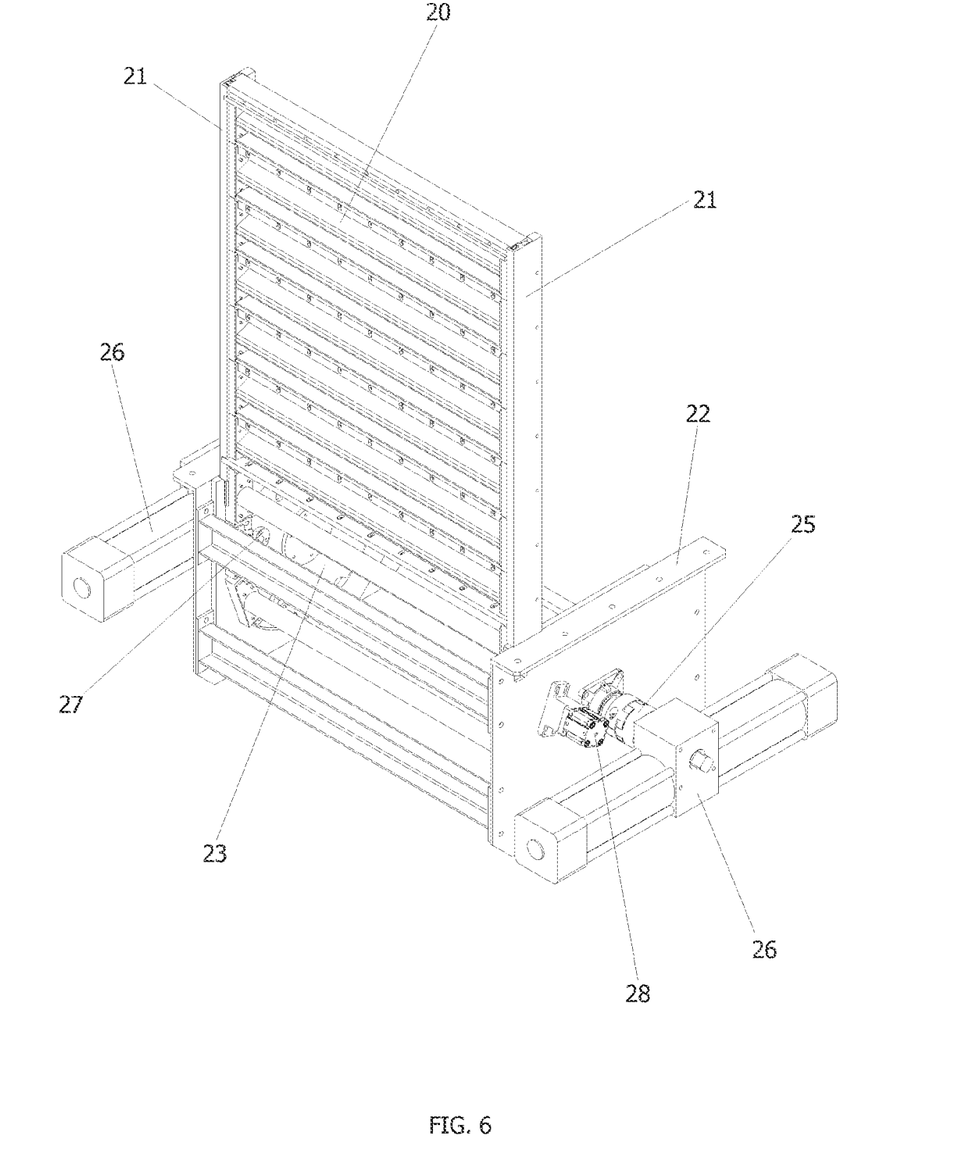
FIG. 6—Perspective view of an alternative segment isolating valve with the plug extended.
Figure 7:
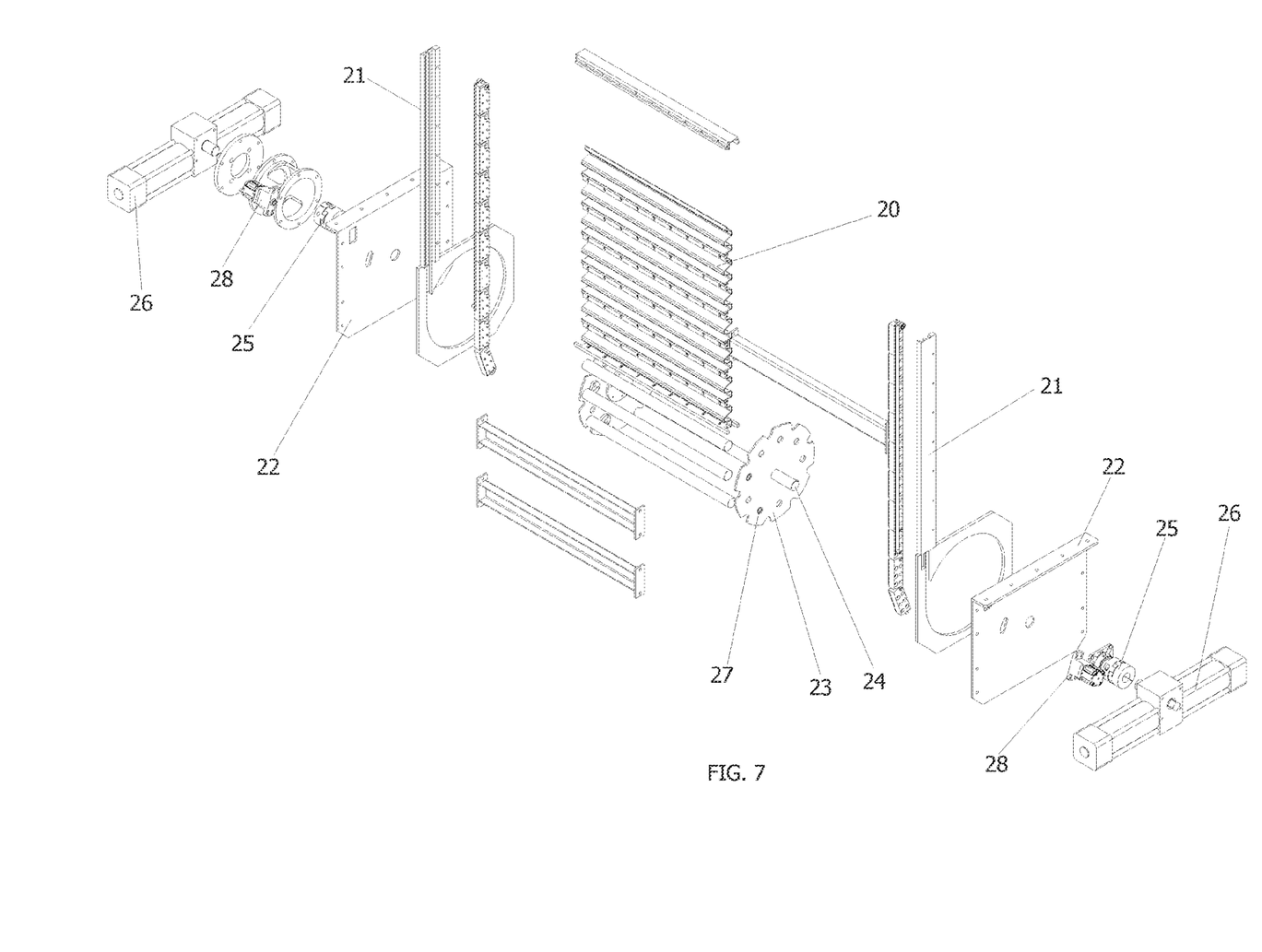
FIG. 7—Exploded perspective view of the alternative segment isolating valve with the plug extended.

FIGS. 5 to 7 described in detail the alternative segment isolating valve, comprising a plug (20) that is comprised of vanes that move along two lateral guides (21) that are assembled in the duct formed by the elevated guideway (1). The lateral guides (21) are affixed to a lower housing (22) where the winding disks (23) rotate, mounted on an axle (24) and fitted with a coupling (25) that is in turn connected to an actuator (26) preferably pneumatic. The winding disc (23) pushes out and pulls back the plug (20) that comprises the plug (20).

The winding discs (23) may have holes (27) for the insertion of a solenoid-operated locking pin (28).

Optionally, the plug (20) may be a flexible flap, preferably made from a polymeric material.

The invention claimed is:

1. A valve for pneumatic transport system comprising: a segment isolating valve that is installed on a lower back of an elevated guideway segment and provided with a plug that slots into a housing affixed to the elevated guideway, wherein the plug is moved by a linear actuator, and wherein a rod of a said linear actuator exerts pressure on an articulation that is pivoted above on the plug and below on a frame affixed to a base of the housing; the segment isolating valve is further provided with a closed position locking cam and springs, the segment isolating valve is mechanically locked by the closed position locking cam, automatically displaced by springs.

2. The valve according to claim 1, wherein the housing is equipped with a rainwater runoff tank.

3. The valve according to claim 1 further comprising a safety locking pin that is actuated by a release solenoid.

4. The valve according to claim 1, wherein the position of the segment isolating valves is given by a position sensor.

5. A valve for pneumatic transport system comprising: a segment isolating valve that is installed on a lower back of a segment of an elevated guideway and provided with a housing affixed to the elevated guideway, and further comprising an articulated plug having vanes that move through two lateral guides that are assembled inside a duct formed by the elevated guideway, with the lateral guides affixed to a housing where winding disks rotate, mounted on an axle fitted with a coupling connected to an actuator: the winding disc pushes out and pulls back the plug through the lateral guides.

6. The valve according to claim 5, wherein the actuator comprises a pneumatic actuator.

7. The valve according to claim 5, wherein the winding disks are provided with holes for the insertion of a solenoid-operated locking pin.

8. A valve for pneumatic transport system comprising: a segment isolating valve that is installed in a lower back of an elevated guideway segment and provided with a plug that is mounted in a housing affixed to the elevated guideway, and further comprises an articulated plug composed of vanes that move through two lateral guides that are mounted in a duct formed by the elevated guideway, with the lateral guides affixed to a lower housing where winding disks rotate, mounted on an axle, and fitted with a coupling that is in turn connected to an actuator; the winding disc pushes out and pulls back the plug through the lateral guides.

9. The valve according to claim 8, wherein the actuator comprises a pneumatic actuator.

10. The valve according to claim 8, wherein the winding disks are provided with holes for the insertion of a solenoid-operated locking pin.

11. The valve according to claim 8, wherein the plug is a flexible flap.

12. The valve according to claim 11, wherein the flexible flap is made of polymeric material.

* * * * *